United States Patent
Walker et al.

(10) Patent No.: US 8,014,479 B2
(45) Date of Patent: Sep. 6, 2011

(54) METHOD AND SYSTEM FOR COMMUNICATING SUB-SYNCHRONIZATION SIGNALS USING A PHASE ROTATOR

(75) Inventors: Glenn A. Walker, Greentown, IN (US); Eric A. DiBiaso, Kokomo, IN (US)

(73) Assignee: Delphi Technologies, Inc., Troy, MI (US)

( * ) Notice: Subject to any disclaimer, the term of this patent is extended or adjusted under 35 U.S.C. 154(b) by 1176 days.

(21) Appl. No.: 11/316,530

(22) Filed: Dec. 22, 2005

(65) Prior Publication Data
US 2007/0147561 A1 Jun. 28, 2007

(51) Int. Cl.
*H04L 7/00* (2006.01)
(52) U.S. Cl. ........ 375/354; 375/267; 375/362; 455/13.3
(58) Field of Classification Search ........... 375/354, 375/267, 362; 455/13.3
See application file for complete search history.

(56) References Cited

U.S. PATENT DOCUMENTS

| | | | |
|---|---|---|---|
| 5,025,455 A * | 6/1991 | Nguyen | 375/327 |
| 5,191,576 A * | 3/1993 | Pommier et al. | 370/312 |
| 5,960,046 A * | 9/1999 | Morris et al. | 375/347 |
| 6,292,516 B1 * | 9/2001 | Petsko et al. | 375/267 |
| 6,618,352 B1 * | 9/2003 | Shirakata et al. | 370/203 |
| 6,944,139 B1 * | 9/2005 | Campanella | 370/315 |
| 7,073,116 B1 * | 7/2006 | Settle et al. | 714/786 |
| 2002/0154059 A1 * | 10/2002 | Lindenmeier et al. | 342/374 |
| 2004/0081247 A1 * | 4/2004 | Chang et al. | 375/259 |
| 2004/0203472 A1 * | 10/2004 | Chien | 455/68 |
| 2005/0013238 A1 * | 1/2005 | Hansen | 370/203 |
| 2005/0181800 A1 * | 8/2005 | Trachewsky et al. | 455/452.1 |
| 2005/0208897 A1 * | 9/2005 | Lyons et al. | 455/67.11 |
| 2006/0045193 A1 * | 3/2006 | Stolpman et al. | 375/260 |
| 2006/0178755 A1 * | 8/2006 | Ling et al. | 700/1 |

\* cited by examiner

*Primary Examiner* — Shuwang Liu
*Assistant Examiner* — Sung Ahn
(74) *Attorney, Agent, or Firm* — Jimmy L. Funke

(57) ABSTRACT

A system and method of communicating sub-synchronization information into a transmitted digital audio stream and extracting sub-synchronization information from a received digital audio stream is provided. The method includes the steps of having a transmitter introduce sub-synchronization information into a data stream at a period less than that of existing transmitter pre-amble signals, and transmitting that data to a receiver. The method further includes the steps of receiving the transmitted data stream in the receiver circuitry, extracting the synchronization information, and using the synchronization information to accurately decode the received audio data.

25 Claims, 8 Drawing Sheets

US 8,014,479 B2

METHOD AND SYSTEM FOR COMMUNICATING SUB-SYNCHRONIZATION SIGNALS USING A PHASE ROTATOR

TECHNICAL FIELD

The present invention generally relates to wireless digital communications, and more particularly, to injecting synchronization information into wirelessly transmitted signals received and decoded by digital transceiver systems in a format and at a rate sufficient to permit the effective use of fast diversity switching antenna systems.

BACKGROUND OF THE INVENTION

Trucks, boats, automobiles, and other vehicles are commonly equipped with various signal communication devices such as radios for receiving broadcast radio frequency (RF) signals, processing the RF signals, and broadcasting audio information to passengers. Satellite digital audio radio (SDAR) services have become increasingly popular, offering digital radio service covering large geographic areas, such as North America. These services receive uplinked programming which, in turn, is rebroadcast directly to digital radios that subscribe to the service. Each subscriber to the service generally possesses a digital radio having a receiver and one or more antennas for receiving the digital broadcast.

In satellite digital audio radio services systems, the radio receivers are generally programmed to receive and decode the digital data signals, which typically include many channels of digital audio. In addition to broadcasting the encoded digital quality audio signals, the satellite service may also transmit data that may be used for various other applications. The broadcast signals may include advertising, information about warranty issues, information about the broadcast audio programs, and news, sports, and entertainment programming. Thus, the digital broadcasts may be employed for any of a number of satellite audio radio, satellite television, satellite Internet, and various other consumer services.

In vehicles equipped for receiving satellite-based services, each vehicle generally includes one or more antennas for receiving the satellite digital broadcast. One example of an antenna arrangement includes one or more antennas mounted in the sideview mirror housing(s) of an automobile. Another antenna arrangement includes a thin phase network antenna having a plurality of antenna elements mounted on the roof of the automobile. The antennas(s) may be mounted at other locations, depending on factors such as vehicle type, size, and configuration.

As the antenna profiles for the satellite-based receiving systems become smaller, performance of the antenna may be reduced. To regain this lost performance, multiple small directional antennas may be used that compliment each other. This type of antenna system relies on switching to the best antenna source for the signal reception. Another option is to combine the antenna with beam steering electronics. For low cost applications, a switched diversity antenna may be employed. In doing so, the RF receiver typically controls which antenna to use by detecting the presence of a desired signal.

Systems employing more than one antenna generally switch to another antenna when the signal from the current antenna is lost, or when the system determines that another antenna has a stronger signal. In a moving vehicle with frequently changing antenna orientations, it is often desirable to switch frequently and quickly among the various system antennas. When the system switches from one antenna to another, the system must acquire the new signal and process it to extract the audio or other data that is being transmitted. However, switching randomly causes the digital demodulator to quickly detect a new signal with an unknown phase. While the phase detector circuitry of many digital receiver demodulators will track the phase to a given position, the resulting data orientation generally will be unknown. Because of the unknown data orientation, it is not possible to correctly interpret the transmitted data.

The unknown phase/orientation problem discussed above can be resolved by transmitting a known data sequence into the data stream at predetermined times. This data sequence can be referred to as a synchronization signal, a pre-amble, or frame synchronization pre-amble (FSP). By first decoding the synchronization or pre-amble bits sent as part of the transmitted signal, the receiver can accurately decode the audio or other data that has been transmitted, and can reproduce that data for the user. However, the decoding of the synchronization bits must occur quickly in order to avoid a delay in the decoding of the audio or other transmitted data. This is because a delay in the data decoding may result in a loss of data, which in turn can result in audio mute for radio applications. To avoid this condition, synchronization data generally needs to be transmitted and received/decoded soon after a switch has been made to a new antenna.

Although some current satellite transmission/reception schemes provide for periodic transmission of synchronization bits to allow a receiver to ultimately decode transmitted data, the frequency of transmission of these synchronization bits is often too slow to allow for use in fast diversity switching antenna systems where rapid switching among antennas is required in order for the system to be effective. It is therefore desirable to provide for a transmission and reception system that provides for enhanced transmission and reception of synchronization information.

SUMMARY OF THE INVENTION

For purposes of this invention, the term "sub-synchronization" means having a time period less than an existing synchronization or pre-amble information (including signals and/or data). The terms "period" and "time period" refer to the amount of time between synchronization information.

In accordance with one aspect of the present invention, a method of communicating sub-synchronization information into a transmitted digital stream at a period of less than existing pre-amble signals already associated with that stream, and extracting sub-synchronization information from a received digital signal stream, is provided. The method includes the steps of generating a data stream including pre-amble signals having a first period, introducing phase-rotated sub-synchronization information into a data stream at a period of less than that of the existing pre-amble signal, and transmitting that data stream to a receiver. The method also includes the steps of receiving the transmitted data stream in the receiver, extracting the sub-synchronization information, and using the sub-synchronization information to accurately decode the received data.

According to another aspect of the present invention, a system utilizing sub-synchronization signals to accurately transmit and receive data is provided. The system includes a communication system transmitter that transmits a signal having pre-amble signals with a first period. The transmitter also includes a phase rotator that introduces sub-synchronization information into the signal at a second period less than that of the first period of the pre-amble signals. The system also includes a communication system receiver having a sub-synchronization correlator that receives the composite signal that includes sub-synchronization signals, and that extracts the sub-synchronization signals and uses them to accurately decode data.

In accordance with a further aspect of the present invention, a receiver capable of receiving sub-synchronization signals to accurately receive and decode transmitted data is provided. The system includes a communication signal receiver containing a sub-synchronization correlator for extracting synchronization information from a phase-rotated sub-synchronization signal. The system receives a signal having a pre-amble signal with a first period and sub-synchronization signals with a period of less than that of the first period of the pre-amble signal, extracts synchronization information from the sub-synchronization signal, and uses the extracted synchronization information to correct for errors.

These and other features, advantages and objects of the present invention will be further understood and appreciated by those skilled in the art by reference to the following specification, claims and appended drawings.

BRIEF DESCRIPTION OF THE DRAWINGS

The present invention will now be described, by way of example, with reference to the accompanying drawings, in which.

DESCRIPTION OF THE PREFERRED EMBODIMENTS

Figure 1:
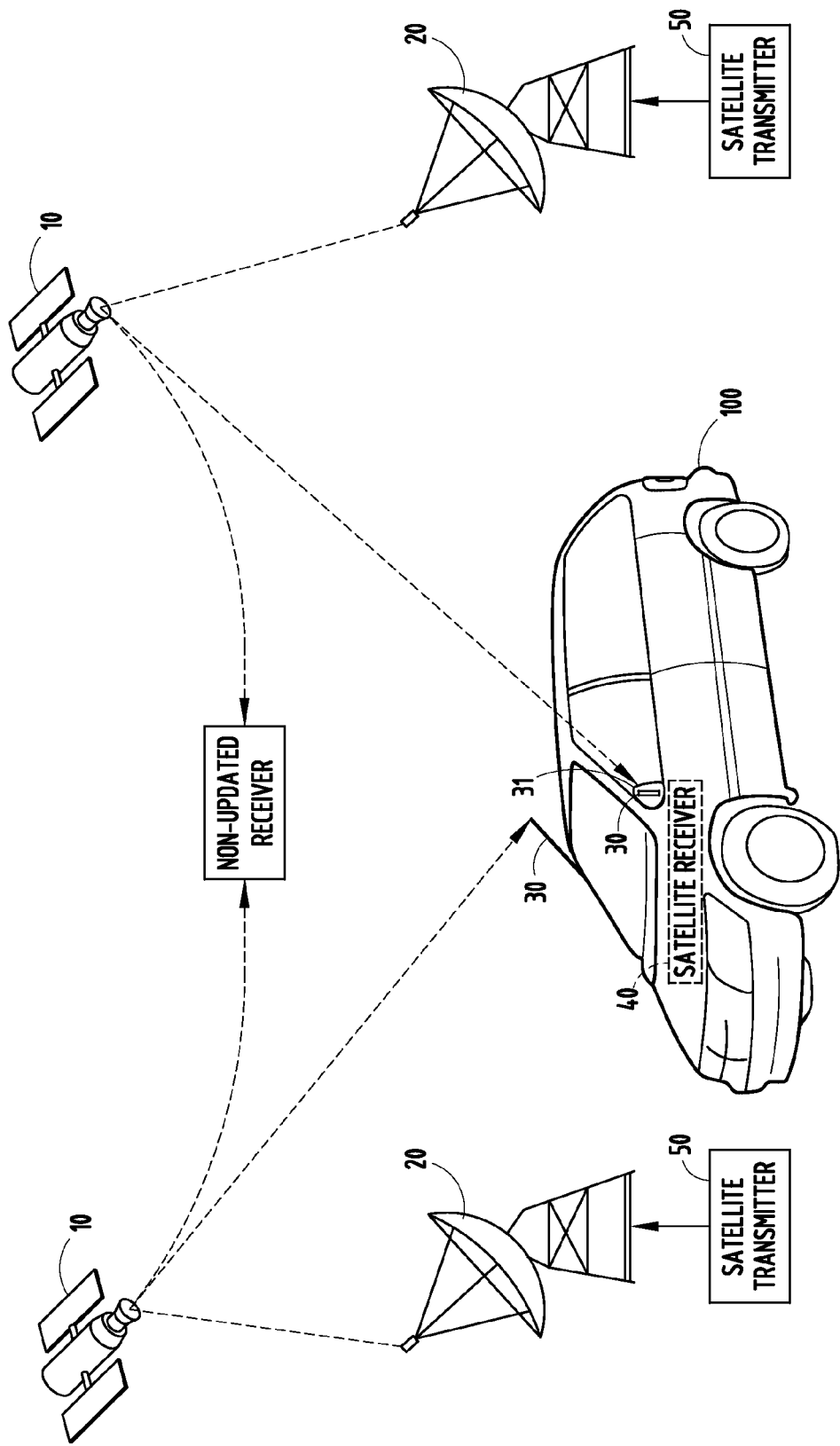
FIG. 1 is a general schematic diagram illustrating a digital communications system employed on a vehicle equipped with multiple antennas for receiving satellite broadcast services.

Referring to FIG. 1, a satellite digital audio radio system is generally illustrated employed on a vehicle 100 having a satellite-based digital audio radio receiver 40, according to one embodiment of the present invention. The satellite digital audio radio service may be used to provide any of a number of consumer services, including radio, television, Internet, and other data broadcast services. The digital radio service system shown includes first and second satellites 10 broadcasting streams of data from satellite transmitter 50 that have been transmitted to satellites 10 via satellite dishes 20. Any number of satellites 10 and satellite transmitters 50 and/or terrestrial transmitters may be employed by the digital audio radio system to broadcast digital signals.

Vehicle 100 is equipped with satellite receiver 40, including signal receivers, in the form of first and second antennas 30, for receiving radio frequency (RF) signals broadcast by any of satellites 10. One of the antennas 30 is shown mounted on the roof of the vehicle 100, and another antennas 30 is shown mounted on or in an exterior rearview mirror 31 of the vehicle 100. The antennas 30 could also be mounted on the tops of each of the two external rearview mirrors. It should be appreciated that any of a number of antennas and antenna arrangements may be employed on various locations of the vehicle 100, for receiving and/or transmitting signals to communicate with remote satellites and/or terrestrial-based communication devices.

Figure 2:
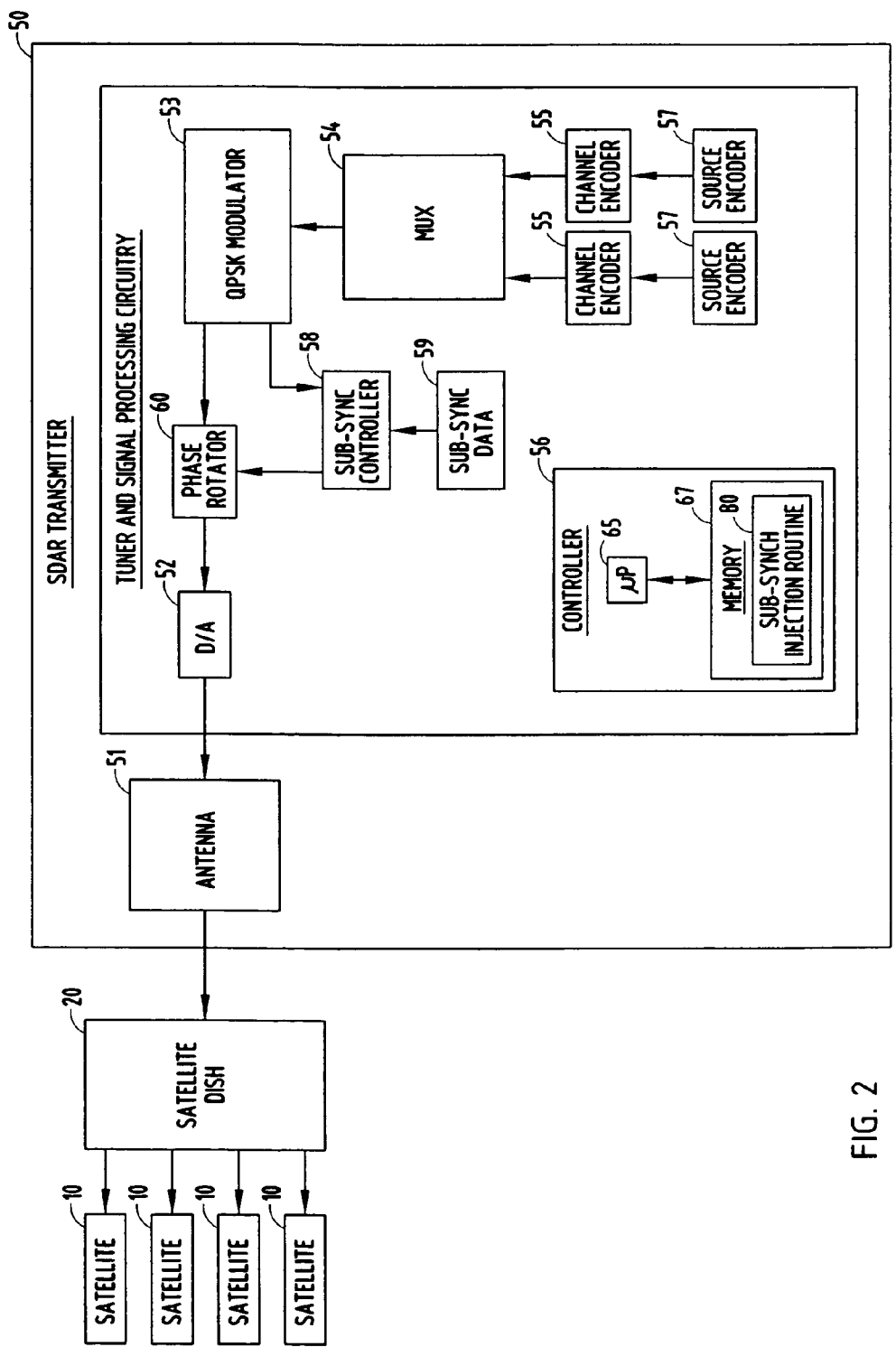
FIG. 2 is a block diagram illustrating a satellite signal transmitter for processing, encoding, and transmitting signals to satellite receivers, according to one embodiment of the present invention.

The satellite transmitter 50 is illustrated in FIG. 2, according to one embodiment of the present invention. The satellite transmitter 50 includes source encoders 57 for encoding the source audio signal, channel encoders 55 for further encoding the source signal prior to transmission, and a multiplexer (MUX) 54 for time division multiplexing the signals to be transmitted. Satellite transmitter 50 is further shown including sub-synchronization data 59 and a sub-synchronization controller 58 connected to a phase rotator 60 to provide sub-synchronization data and signals in conjunction with channel and source encoded data 55 and 57 for injection into the transmitted signal. Transmitter 50 further includes a QPSK modulator 53 for modulating the signals provided by MUX 54, a digital-to-analog converter 52 for converting the digital signals from phase rotator 60 to analog form, and an antenna 51 for transmitting the signal to satellite antenna dish 20 for further transmission to one or more satellites 10. Digital signal transmitter 50 may also include a root raised cosine filter for filtering the signal from QPSK modulator 53 before it is processed by digital-to-analog converter 52, and upmixer circuitry between digital-to-analog converter 52 and antenna 51. Digital signal transmitter 50 may further include controller 56, equipped with a microprocessor 65 and memory 67, to assist in the processing of the signals to be transmitted.

Figure 3:
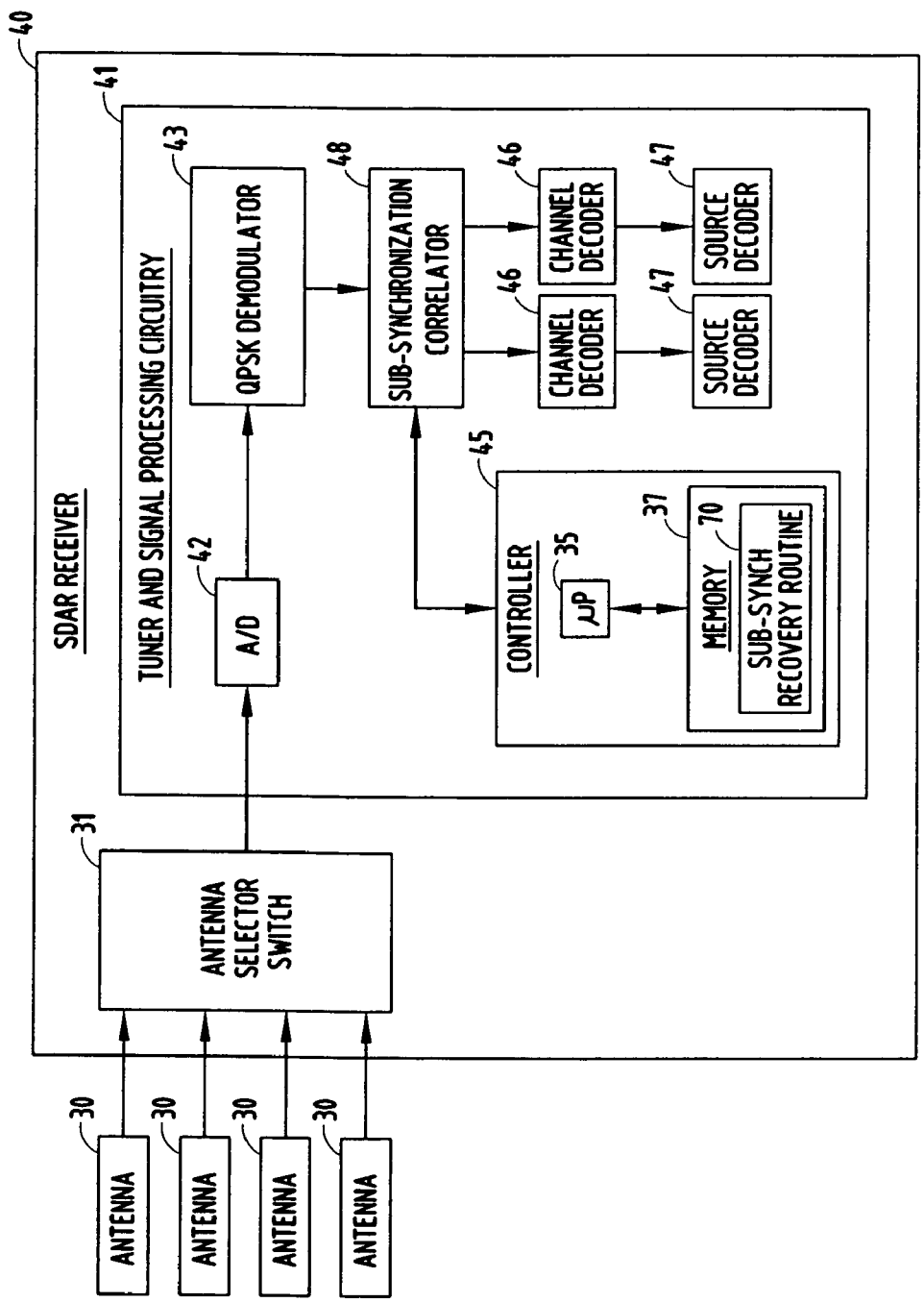
FIG. 3 is a block diagram illustrating a satellite receiver system for receiving and processing satellite signals from multiple antennas, according to one embodiment of the present invention.

The digital satellite receiver 40 employed on vehicle 100 is shown in FIG. 3, according to a first embodiment of the present invention. The receiver 40 has inputs for receiving RF signals containing streams of broadcast data received from each of the antennas 30. The input signals received by N number of antennas 30 may be satellite and/or terrestrial-based broadcast signals. The digital satellite receiver 40 is configured to receive signals from the antennas 30, selectively switch between the antenna signals, and further process signals from the selected antenna. The receiver 40 includes an antenna select switch 31, for selecting which of the output signals from antennas 30 to select for processing. Additionally, the receiver 40 includes tuner and signal processing circuitry 41, for receiving selected signals from one of antennas 30, selecting a frequency bandwidth of a digital, audio, and/or other data to pass RF signals within a tuned frequency bandwidth, and for processing tuned frequency signals, including demodulating and decoding the signals to extract time division multiplex digital data from the received selected and tuned signals.

The receiver 40 is further shown including an analog-to-digital converter 42, a QPSK demodulator 43, a sub-synchronization correlator 48 for extracting sub-synchronization data, channel decoders 46, source decoders 47, and a controller 45 having a microprocessor 35 and memory 37. The microprocessor 35 may include a conventional microprocessor having the capability for processing routines and data, as described herein. The memory 37 may include read-only memory ROM, random access memory RAM, flash memory, and other commercially available volatile and non-volatile memory devices. Stored within the memory 37 of controller 45 are data and routines for selecting and processing received data. As is shown in FIG. 3, the memory 37 of controller 45 may optionally include a sub-synchronization recovery routine 70 that is executed by the microprocessor 35. Controller 45 may alternately be in the form of alternative digital and/or analog circuitry.

The operation of the satellite digital audio system is now discussed according to one embodiment of the present invention. As shown in FIG. 2, source audio signals generated by devices external to digital signal transmitter 50 are supplied to the source encoders 57 of the digital signal transmitter 50. Those signals are further encoded by channel encoders 55, the outputs of which are input to MUX 54. The output signal from MUX 54 is provided to QPSK modulator 53, where the signal is modulated. The resulting modulated signal includes pre-amble signals having a first period. The modulated signal from QPSK modulator 53 is then provided to sub-synchronization controller 58 and phase rotator 60. Utilizing sub-synchronization data 59 and modulated data from QPSK modulator 53, sub-synchronization controller 58 provides a sub-synchronization signal (also referred to as a modified transmit signal M) to phase rotator 60. The sub-synchronization signal has a period less than that of the first period of the pre-amble signal. Phase rotator 60 rotates the phase of its output signal based on the input from sub-synchronization controller 58 and QPSK modulator 53, and provides a digital output signal containing modified transmit signals to digital-to-analog converter 52 for conversion into an analog format for transmission. The analog signals are then passed from digital-to-analog converter 52 to antenna 51, at which point they leave the digital signal transmitter and are passed on to satellite dish 20 for transmission to one or more satellites 10 for broadcast transmission to receivers 40. The transmitted signals contain both the pre-amble signals and the sub-synchronization signals. Controller 56, which in the illustrated embodiment includes microprocessor 65 and memory 67, along with a sub-synchronization injection routine 80, may be used to assist in the generation of sub-synchronization signals (here, modified transmit signals M), and the incorporation of the sub-synchronization signals into the final transmitted signals.

Modified transmit signals M, discussed above, have a predetermined length, and occur at a predetermined period that is less than the period of existing pre-amble signals generally transmitted by digital satellite transmitters. In addition, the modified transmit signals are created in a known and predictable manner, and can therefore be detected and interpreted by new receivers having the updated sub-synchronization correlator functionality discussed below. The modified transmit signals M can then be used by the receiver to correct for both the in-phase (I) bit ambiguity, and the quadrature (Q) bit ambiguity in the received signal. In the present embodiment, the Q ambiguity in the QPSK signal can be resolved by modifying transmit signals using the following exemplary algorithm: If Q data=1, then send I=I and Q=1, else send I=sign (I)*sqrt (2) and Q=0. The I ambiguity in the QPSK signal can be resolved by creating and transmitting modified transmit signals using the following exemplary algorithm: If I data=1, then send Q=Q and I=1, else send Q=sign(Q)*sqrt (2) and I=0. By using these exemplary algorithms for creating modified transmit signals M, a "wobbling" effect is created (due to the randomness of the data) that should be biased in a known direction, allowing phase ambiguities to be resolved by the receiver.

Figure 2A:
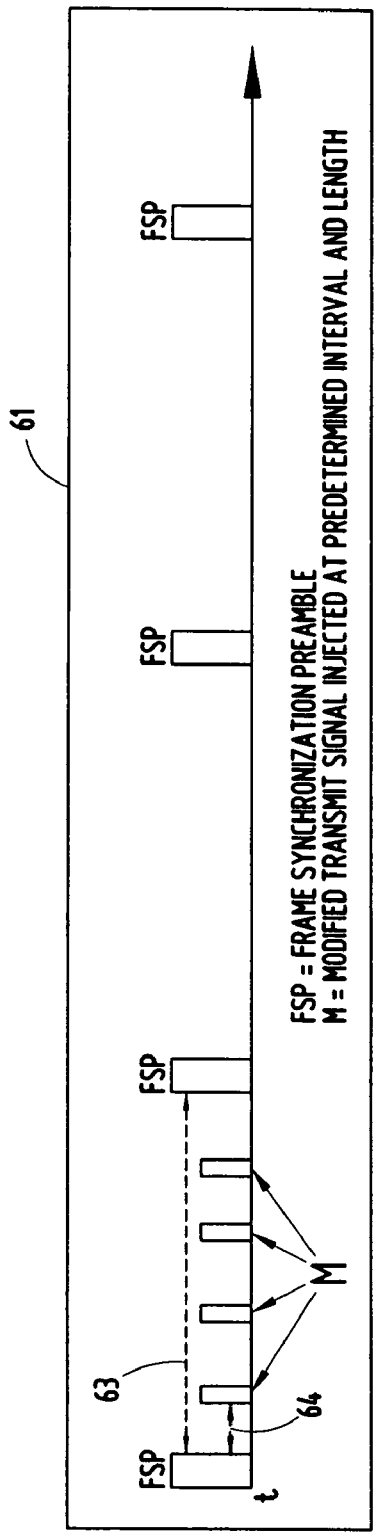
FIG. 2A is a timing diagram generally illustrating signals associated with one embodiment of the present invention.

A timing diagram 61, shown in FIG. 2A, illustrates the output signals from digital satellite transmitter 50 including the modified transmit signals M that have been injected into the transmitted signal. As shown, the modified transmit signals have a period 64 that is less than the period 63 of frame synchronization pre-ambles (FSPs) generally transmitted by digital satellite transmitters and used by the receivers to determine the correct phase and polarity of received signals. In one embodiment, the transmitter uses FSPs with a period of approximately 2 milliseconds. In this case, the modified transmit signals M are injected with a period less than 2 milliseconds (for example, between 250 and 500 microseconds). It should be noted that satellite transmitter 50 may optionally transmit standard FSP signals having a greater or lesser time period than 2 milliseconds. As noted above, the period 64 of modified transmit signals M will be selected to be less than the period 63 of the standard FSP signal of the transmitter 50.

After being transmitted via satellite dish 20 and one or more satellites 10, the transmitted signals are received by digital satellite receiver 40. Antennas 30, connected to the digital satellite receiver shown in FIG. 3, receive the signals transmitted by the digital satellite transmitter in FIG. 2. Antenna selector switch 31 of digital satellite receiver 40 selects from among the antenna signals 30 and passes the signal from one antenna on to the tuner and signal processing circuitry 41. The passed signal is converted to digital form by analog-to-digital converter 42 and then passed on to QPSK demodulator 43. The signals are then passed from QPSK demodulator 43 to sub-synchronization correlator 48. Sub-synchronization correlator 48 extracts the sub-synchronization data (here, modified transmit signals) transmitted by transmitter 50 and uses the sub-synchronization data to correct for any phase or polarity ambiguity in the received data. With the ambiguities removed, the signals are de-multiplexed and provided to channel decoders 46 and source decoders 47, at which point they may be played back by electronics in the vehicle or other audio system. During decoding and processing of the received signal, controller 45, which in the illustrated embodiment includes a microprocessor 35 and memory 37, along with a sub-synchronization recovery routine 70, may be used to assist in the processing.

Figure 4A:
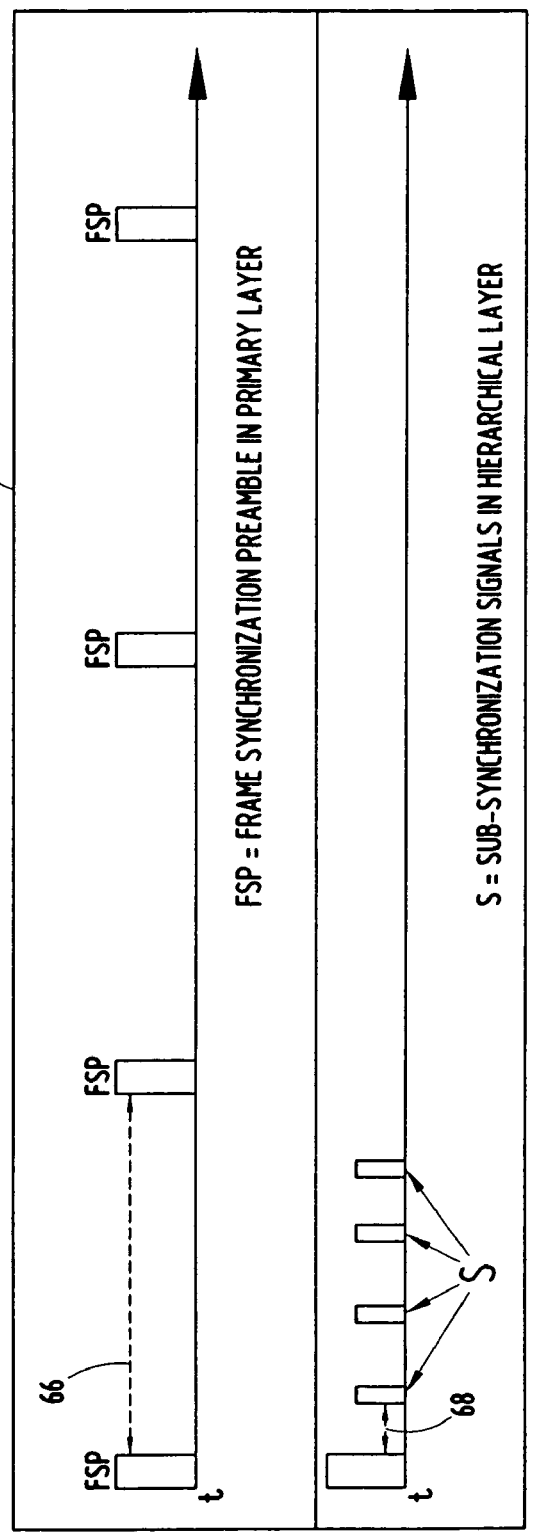
FIG. 4A is a timing diagram generally illustrating signals associated with another embodiment of the present invention.
Figure 4:
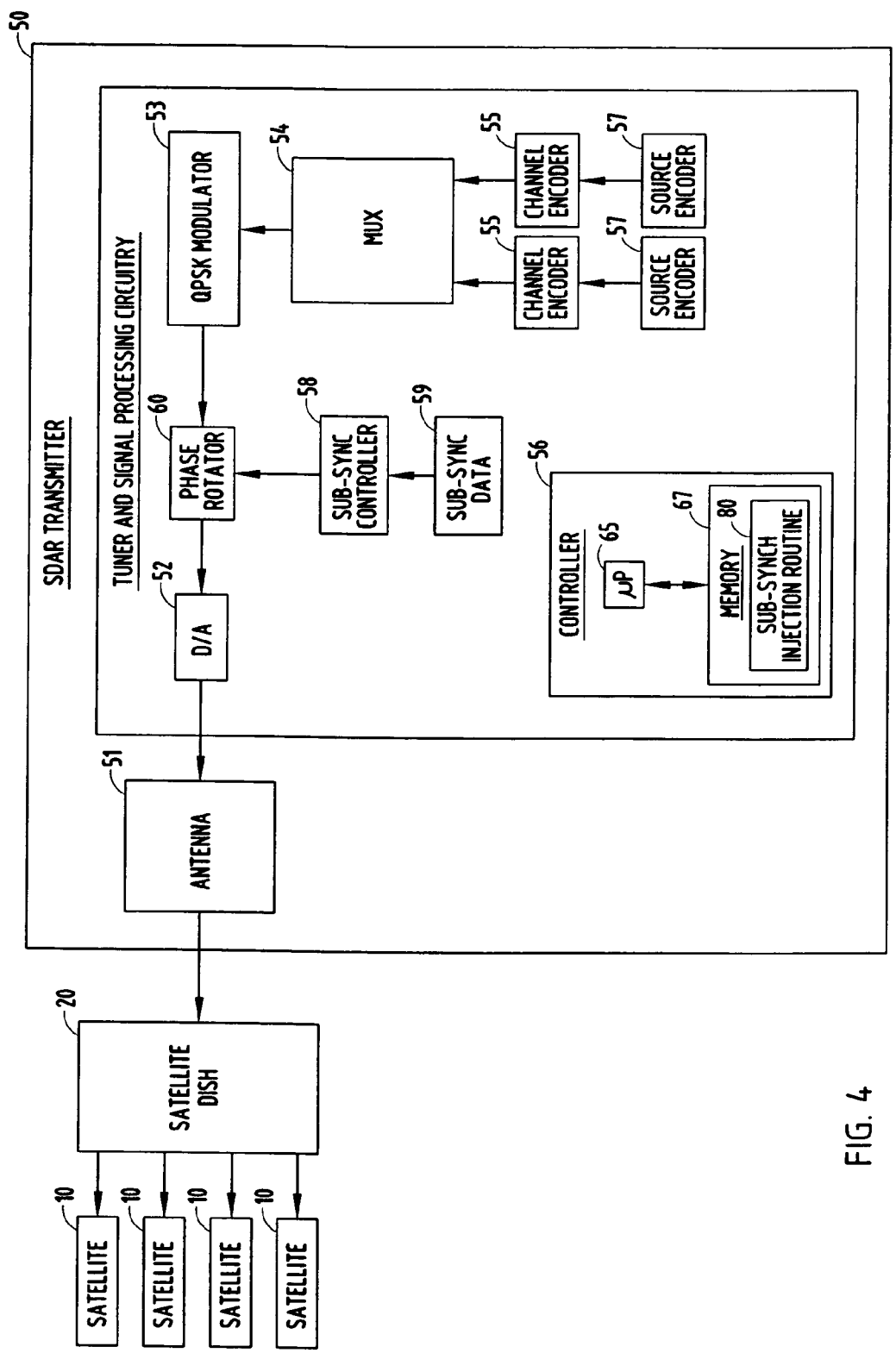
FIG. 4 is a block diagram illustrating a satellite transmitter system for processing, encoding, and transmitting signals to satellite receivers, according to another embodiment of the present invention.

In another embodiment, similar to the embodiment shown in FIG. 2, digital satellite transmitter 50 employs an alternate configuration shown in FIG. 4. In this embodiment, sub-synchronization data 59 is provided to sub-synchronization controller 58, which then provides the sub-synchronization data to phase rotator 60. The source audio signals generated by devices external to digital signal transmitter 50 are supplied to the source encoders 57 of the digital signal transmitter 50. Those signals are further encoded by channel encoders 55, the outputs of which are input to MUX 54. The output signal from MUX 54 is then provided to QPSK modulator 53 for modulation. The modulated signal from QPSK modulator 53 is then provided to phase rotator 60. As noted above, the modulated signal from QPSK modulator 53 includes pre-amble signals having a first period.

The phase rotator 60 combines the sub-synchronization data from sub-synchronization controller 58 with the modulated signal from QPSK modulator 53 such that the resulting output signal contains sub-synchronization signals (also referred to as sub-frame synchronization pre-ambles or sub-FSPs) in a hierarchical layer separate from the primary signal layer. The sub-synchronization signals have a period that is less than that of the first period of the pre-amble signals. The digital output signal from phase rotator 60 containing sub-synchronization signals in a hierarchical layer is then provided to digital-to-analog converter 52 for conversion into an analog format for transmission. The analog signals are then passed from digital-to-analog converter 52 to antenna 51, at which point they leave the digital signal transmitter and are passed on to satellite dish 20 for transmission to one or more satellites 10. Controller 56, which in the illustrated embodiment includes microprocessor 65 and memory 67, along with a sub-synchronization injection routine 80, may be used to assist in the generation and injection of sub-FSP signals into a hierarchical layer, and their incorporation into the final transmitted signals. Digital signal transmitter 50 may also include a root raised cosine filter for filtering the signal from QPSK modulator 53 before it is processed by digital-to-analog converter 52, and upmixer circuitry between digital-to-analog converter 52 and antenna 51.

As shown in timing diagram 62 of FIG. 4A, the output signals of the transmitter include sub-synchronization signals S injected into a hierarchical signal layer by phase rotator 60. In this embodiment, the sub-synchronization data is transmitted in a layer separate from the primary signal layer. The resulting transmitted signal is received by satellite receiver 40 and processed in a manner similar to that described in the previous embodiment. In other words, the sub-synchronization correlator 48 shown in FIG. 3 extracts sub-synchronization data (here, sub-synchronization signals S) from the hierarchical layer of the demodulated signals, and uses that sub-synchronization data to correct for phase and polarity errors in the received data. This enables channel decoders 46 and source decoders 47 to accurately process the received data. The data can then be played back on electronics in the vehicle or other audio system. As noted in the previous embodiment, the output signal of transmitter 50 includes a standard FSP signal. The period 68 of the sub-synchronization signals S injected into the hierarchical signal layer by phase rotator 60 will have a period less than the period 66 of the standard FSP signal.

Figure 5:
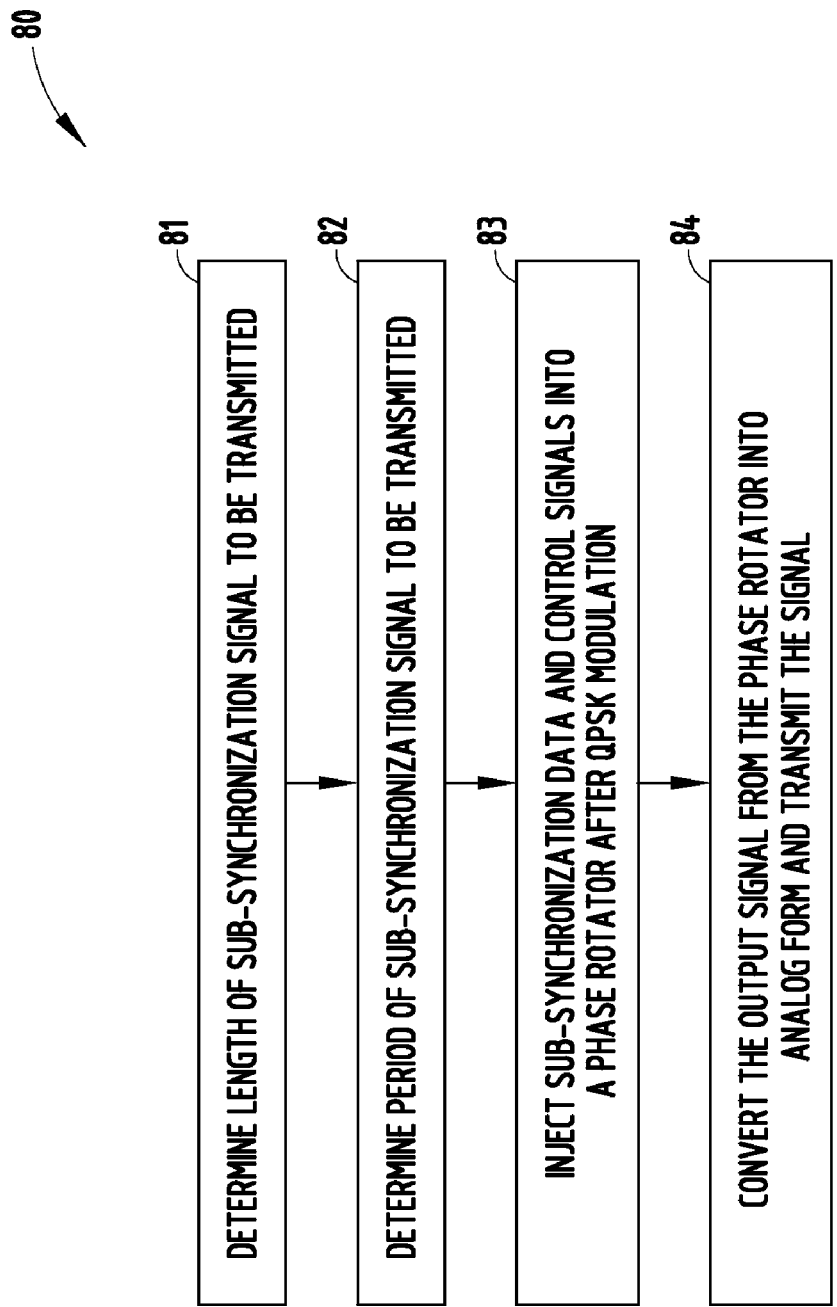
FIG. 5 is a flow diagram illustrating a sub-synchronization injection routine for injecting sub-synchronization signals into a signal stream, according to one embodiment of the present invention.

Referring to FIG. 5, sub-synchronization injection routine 80 is shown for injecting sub-synchronization signals into a transmitted data stream transmitted by the digital satellite transmitter. Routine 80 begins at step 81 and calls for the determination of the length of the sub-synchronization signals to be transmitted. In step 82, the period of the sub-synchronization signal to be transmitted is determined. According to the teachings of the present invention, the period of the sub-synchronization signal is less than the period of the existing pre-amble signal of the transmitter. In step 83, the sub-synchronization signal and control signals are provided to phase rotator 60 for incorporation into the signal after the source and channel data have been modulated by QPSK modulator 53. In step 84, the phase-rotated signal containing the sub-synchronization data is converted to analog form and transmitted.

Figure 6:
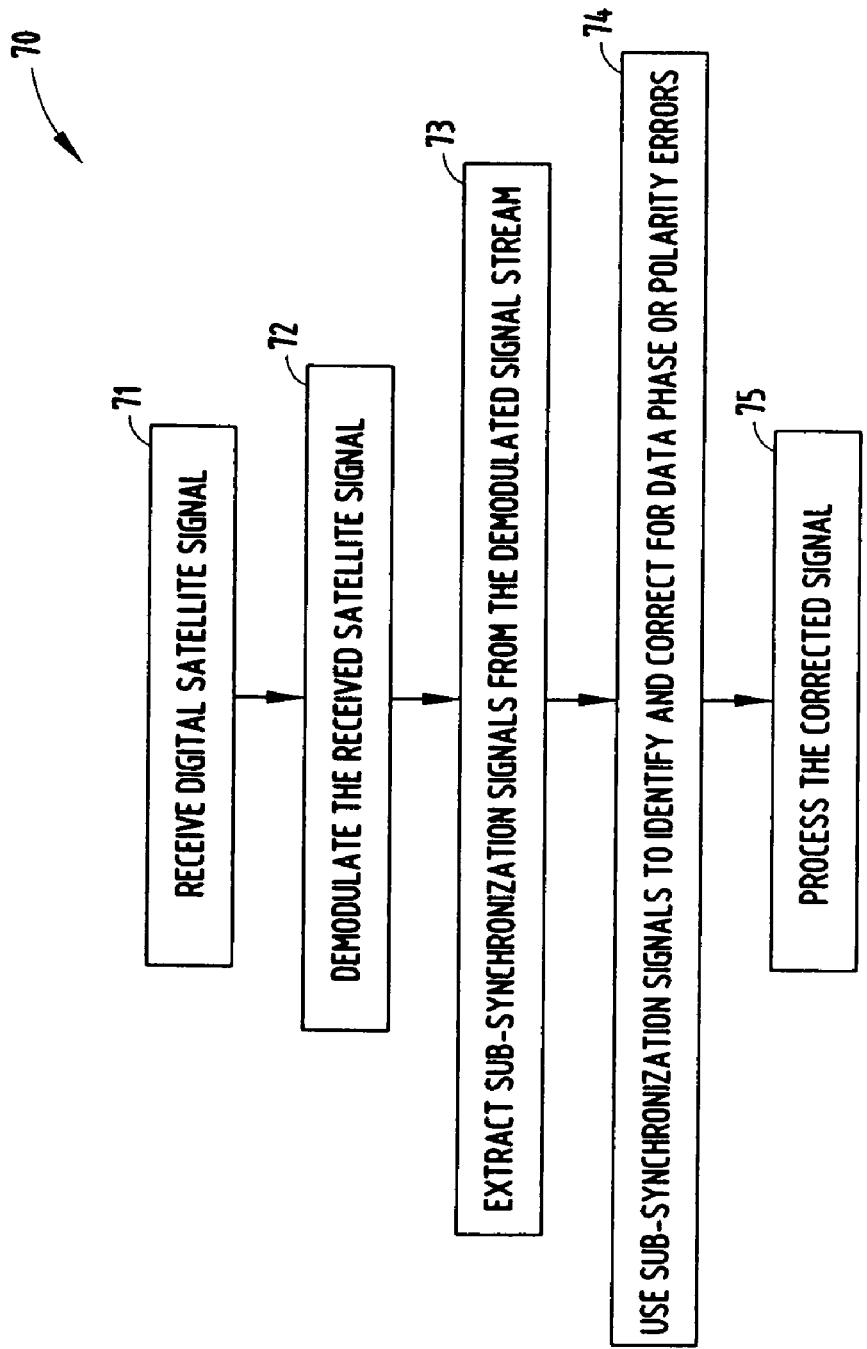
FIG. 6 is flow diagram illustrating a sub-synchronization recovery routine for extracting and utilizing sub-synchronization signals from a signal stream, according to one embodiment of the present invention; and, FIG. 7 is a flow diagram illustrating a sub-synchronization signal injection and recovery routine for injecting signals into, and extracting sub-synchronization signals from, a signal stream, according to another embodiment of the present invention.

Referring to FIG. 6, the sub-synchronization recovery routine 70 is shown for extracting and using the sub-synchronization signals. Routine 70 begins at step 71 and calls for receiving a transmitted signal in receiver 40. Routine 70 then proceeds to step 72, where the signal is demodulated. In step 73, the sub-synchronization signals, having a period of less than the existing pre-amble signal, are extracted from the received data stream by a sub-synchronization correlator. In step 74, the receiver uses the extracted sub-synchronization signals to correct for phase or polarity errors in the received data stream. In step 75, the now correlated signal is further processed by the data decoder circuitry to extract the data.

Figure 7:
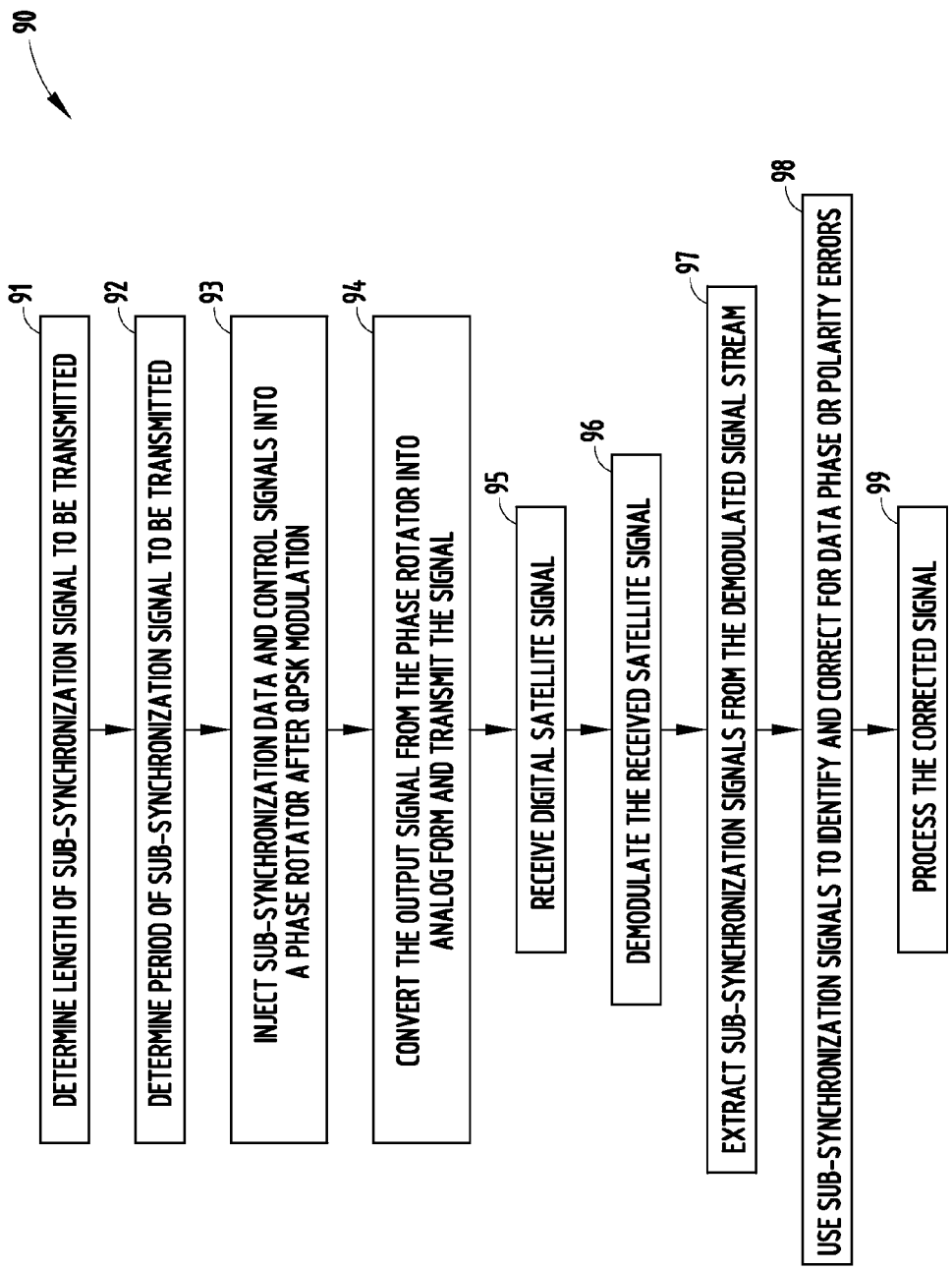

Referring to FIG. 7, routine 90 is shown for the overall process of injecting sub-synchronization signals into a transmitted digital satellite data stream and extracting and using the sub-synchronization signals to accurately decode the transmitted data. Routine 90 begins at step 91 and calls for determination of a desired sub-synchronization signal length to be transmitted. In step 92, the desired sub-synchronization period is determined. According to the teachings of the present invention, the period of the sub-synchronization signal is less than the existing pre-amble signal of the transmitter. In step 93, the sub-synchronization signal and control signals are provided to phase rotator 60 for incorporation into the signal after the source and channel data have been modulated by QPSK modulator 53. In step 94, the output signal from phase rotator 60 is converted into analog form and transmitted. In step 95, a signal containing the sub-synchronization signal is received by a digital satellite receiver. In step 96, the received signal is demodulated. In step 97, sub-synchronization signals are extracted from the demodulated signal stream by a sub-synchronization correlator. In step 98, the receiver uses the extracted sub-synchronization signals to correct for phase and polarity errors in the received signal. Finally, in step 99, the corrected signal is processed and the transmitted audio data is extracted.

It should be appreciated that the satellite receiver shown and the satellite transmitter of the present invention will allow satellite transmission and receiver systems using multiple antennas to quickly switch from one antenna source to another using the sub-synchronization signals taught by the present invention. By providing and decoding sub-synchronization signals, the present invention advantageously provides the ability to rapidly switch from among several antennas without severely negatively impacting the quality of the audio received.

The above description is considered that of the preferred embodiments only. Modifications of the invention will occur to those skilled in the art and to those who make or use the invention. Therefore, it is understood that the embodiments shown in the drawings and described above are merely for illustrative purposes and not intended to limit the scope of the invention, which is defined by the following claims as interpreted according to the principles of patent law, including the doctrine of equivalents.

The invention claimed is:

1. A method for communicating sub-synchronization information in a communication system, comprising the steps of:
    generating a data stream comprising pre-amble information having a first period;
    introducing phase-rotated sub-synchronization information into the data stream at a second period less than that of the first period of the pre-amble information, wherein a modified signal has a wobbling effect that is biased in a known direction;
    transmitting the modified signal comprising the data stream containing the sub-synchronization information to one or more receivers;
    receiving via one or more updated, coherent receivers the modified transmitted signal containing the sub-synchronization information, wherein the introduction of the sub-synchronization information comprises the sub-synchronization information modifying data in the data stream;

switching among a plurality of antennas, and passing the received signal from one antenna;

extracting the sub-synchronization information from the transmitted signal via the one or more updated, coherent receivers;

decoding the transmitted signal using the extracted sub-synchronization information via the one or more updated, coherent receivers, wherein the extracted sub-synchronization information is used to correct for at least one of phase and polarity ambiguity in the received signal, the phase ambiguities being resolved based upon the wobbling effect being biased in a known direction, wherein a quadrature ("Q") bit ambiguity and an in-phase ("I") bit ambiguity are resolved at different times, which allows for quickly switching among the plurality of antennas; and receiving via one or more non-updated receivers, the modified transmitted signal, wherein the sub-synchronization information appears as noise, wherein the Q ambiguity is solved by an algorithm comprising if Q data=1, then send I=I and Q=1, else send I=sign (I)*sqrt (2) and Q=0, and the I ambiguity is solved by an algorithm comprising if I data=1, then send Q=Q and I=1, else send Q=sign (Q)*sqrt (2) and I=0.

2. The method of claim 1, wherein the sub-synchronization information is introduced into the data stream by a transmitter by providing known sub-synchronization data and at least one of modulated source and channel data to a controller, wherein the controller introduces the sub-synchronization data and at least one of the modulated source and channel data to a phase rotator, said phase rotator further receiving at least one of the modulated source and channel data from a modulator.

3. The method of claim 1, wherein the sub-synchronization information is introduced into the data stream by a transmitter by providing sub-synchronization data to a phase rotator by means of a controller, and wherein at least one of a modulated source and channel data is also provided to said phase rotator by a modulator.

4. The method of claim 1, wherein the sub-synchronization information is introduced by a transmitter into a hierarchical layer different from a primary signal layer of the transmitter, such that the one or more non-updated receivers decodes the primary signal layer, while the sub-synchronization information appears as noise.

5. The method of claim 1, wherein the sub-synchronization data is used by the one or more updated receivers to detect at least one of the phase and polarity of the transmitted signal.

6. The method of claim 1, wherein the sub-synchronization information has a period of between 250 microseconds and 500 microseconds.

7. The method of claim 1, wherein the data content of the sub-synchronization information transmitted at a predetermined point in the data stream is known in advance by the one or more updated receivers.

8. The method of claim 1, wherein the sub-synchronization information introduced into the data stream has a period of less than 2 milliseconds.

9. The method of claim 1, wherein the sub-synchronization information comprises quadrature and in-phase data created using an algorithm such that they can be decoded by the one or more updated receivers, so that the modified transmitted signal used to correct both the in-phase bit ambiguity and the quadrature bit ambiguity.

10. The method of claim 1, wherein the sub-synchronization information is used to enable fast antenna switching times in the one or more updated receivers with multiple antennas.

11. The method of claim 1, wherein the one or more updated receivers supports Satellite Digital Audio Radio (SDAR) communication.

12. A system for transmitting and receiving communication signals containing a sub-synchronization information having a period less than that of an existing pre-amble signal, comprising:

at least one communication signal transmitter for transmitting a modified signal comprising a data stream having pre-amble signals at a first period, the transmitter comprising a phase rotator for introducing sub-synchronization information into the data stream at a second period, wherein the introduction of the sub-synchronous information comprises the sub-synchronous information modifying data in the data stream less than that of the first period, and the modified signal has a wobbling effect that is biased in a known direction;

at least one updated, coherent communication signal receiver for receiving the modified transmitted signal, the receiver comprising a sub-synchronization correlator for extracting the sub-synchronization information from the signal received from the transmitter and an antenna selector configured to switch among a plurality of antennas, and passing the received signal from one antenna, said receiver further decoding the transmitted signal using the extracted sub-synchronization information, wherein the modified transmitted signal is used to correct both an in-phase bit ambiguity and a quadrature bit ambiguity, the phase ambiguities being resolved based upon the wobbling effect being biased in a known direction, wherein a quadrature ("Q") bit ambiguity and an in-phase ("I") bit ambiguity are resolved at different times, such that the Q ambiguity is solved by an algorithm comprising if Q data=1, then send I=I and Q=1, else send I=sign (I)*sqrt (2) and Q=0, and the I ambiguity is solved by an algorithm comprising if I data=1, then send Q=Q and I=1, else send Q=sign (Q)*sqrt (2) and I=0, which allows for quickly switching among the plurality of antennas; and at least one non-updated communication signal receiver for receiving the modified transmitted signal, wherein the sub-synchronization information appears as noise.

13. The system of claim 12, wherein at least one updated communication signal receiver supports Satellite Digital Audio Radio (SDAR) communication.

14. The system of claim 12, wherein the communication signal transmitter includes at least one controller, said controller providing signals to assist in the introduction of sub-synchronization information into the data stream.

15. The system of claim 12, wherein the communication signal transmitter introduces sub-synchronization information having a period less than 2 milliseconds into the transmitted data stream.

16. The system of claim 12, wherein the updated communication signal receiver uses the received sub-synchronization information to detect at least one of the phase and polarity of the received signal.

17. The system of claim 12, wherein the updated communication signal receiver uses the received sub-synchronization information to accurately decode data in the received signal.

18. The system of claim 12, wherein the updated communication signal receiver knows in advance the data content of the sub-synchronization information transmitted by the transmitter.

19. The system of claim 12, wherein the sub-synchronization information introduced into the data stream by the communication signal transmitter is introduced into a hierarchical layer separate from a primary signal layer, such that the at least one non-updated communication signal receiver decodes the primary signal layer, while the sub-synchronization information appears as noise.

20. The system of claim 12, wherein the sub-synchronization information introduced into the data stream by the communication signal transmitter comprises modified transmit signals of a predetermined interval and length, and wherein Quadrature and In-phase elements of the modified transmit signals are created by an algorithm such that they can be accurately decoded by at least one updated communication signal receiver.

21. The system of claim 12, wherein at least one updated communication signal receiver is connected to more than one antenna, and the sub-synchronization information introduced into the data stream by the communication signal transmitter is used to enable faster antenna switching times among the multiple antennas.

22. The system of claim 12, wherein the sub-synchronization information is created by a software routine present in the communication signal transmitter hardware, and is incorporated into the signal by the software routine present in the communication signal transmitter hardware.

23. The system of claim 12, wherein the sub-synchronization information is extracted from the signal by a software routine present in the updated communication signal receiver hardware.

24. The method of claim 1, wherein the step of introducing sub-synchronous information into the data stream comprises modifying data in a hierarchical signal layer.

25. The method of claim 1 further comprising the step of creating a wobbling effect that is biased in a known direction as a function of a randomness of the modified data, which allows phase ambiguities to be resolved.

* * * * *